FLOATING SHOE FOR ONE OR MORE RECORDING HEADS

Filed June 5, 1968 2 Sheets-Sheet 1

INVENTORS.
EVERHARDUS A. MUIJDERMAN
JOHANNES M. VISSCHER
JAN VAN DER HILST
BY

AGENT

INVENTORS.
EVERHARDUS A. MUIJDERMAN
JOHANNES M. VISSCHER
BY JAN VAN DER HILST
Frank R. Trifari
AGENT 3,525,987

FLOATING SHOE FOR ONE OR MORE RECORDING HEADS

Everhardus Albertus Muijderman, Johannes Mattheus Visscher, and Jan van der Hilst, Emmasingel, Eindhoven, Netherlands, assignors, by mesne assignments, to U.S. Philips Corporation, New York, N.Y., a corporation of Delaware Filed June 5, 1968, Ser. No. 734,732
Claims priority, application Netherlands, Oct. 25, 1967, 6714454
Int. Cl. G11b 5/60, 21/20
U.S. Cl. 340—174.1 3 Claims

ABSTRACT OF THE DISCLOSURE

A floating shoe for a magnetic head wherein the characteristic number (G) as defined by $$G=\frac{6\eta UB}{P_a h_{min.}^2}$$

Figure 1:
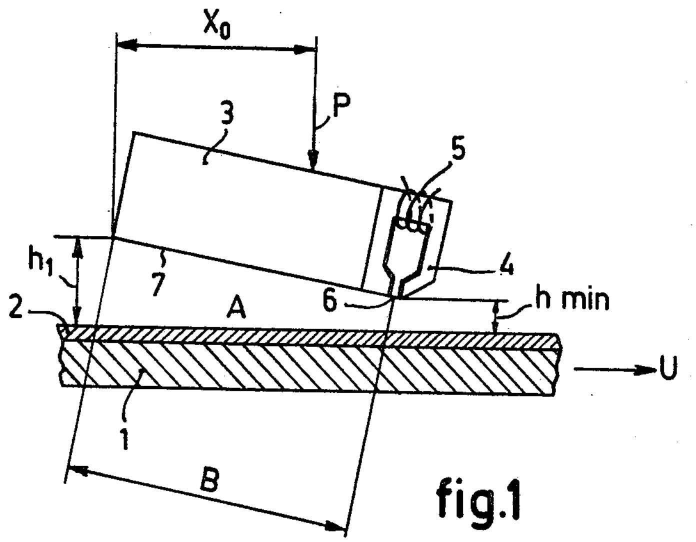

is equai to or greater than fifty. The width of the bearing surface is at least three times the length.

The invention relates to a floating shoe for one or more recording heads in a device for recording and/or reproducing magnetic registrations, comprising a disc-shaped or cylindrical recording surface.

In devices of the kind comprising a rotatable a disc-shaped or cylindrical recording surface it is common practice to provide a small constant distance between the gap of the recording heads and the recording surface by utilizing the aerodynamic lubrication principle. In this case one or more recording heads are incorporated in a block—the so-called floating shoe—whose side facing the recording surface—the so-called bearing surface—enclose with the recording surface a space narrowing in the direction of movement of the recording surface. The gap of the recording head is located at the area or in the immediate proximity of the minimum distance between the floating shoe and the moving recording surface. In the narrowing space between the bearing surface and the recording surface viscous frictional forces of the relevant medium, usually air, provide for a pressure which supplies the bearing force for the floating shoe establishing an equilibrium with a load applied to the shoe externally. The air cushion thus formed behaves like a comparatively rigid spring so that the shoe can follow the unevennesses and swinging movements of the recording surface without an appreciable variation of the distance between the gap of the head and the recording surface.

Modern computer technology tends to attain short access times and high information density, which requires an increase in speed of rotation of the recording surface and a reduction of the distance between this surface and the gap of the head. This means that higher values of the characteristic number G of the floating shoe known in this domain have to be attained; said number is defined as follows:

$$G=\frac{6\eta UB}{P_a h_{min.}^2}$$

wherein:

$\eta$=dynamic viscosity of the ambient medium, N (N sec./m.$^2$),

U=linear speed of movement of the recording surface, m./sec.),

B=bearing surface dimensions of the shoe measured in the direction U, (m.), $P_a$=ambient pressure of said medium, (N/m.$^2$), $h_{min.}$=minimum distance between the bearing surface and the recording surface, (m.).

The efforts for attaining small distances of the head and high speeds involve difficulties due to the static instability of floating shoes having a flat bearing surface and an inadmissible high bearing force with floating shoes having curved, for example, cylindrical or spherical bearing surfaces. The static instability involved in flat floating shoes is due to the compressibility of the air and becomes manifest in a reduction of the bearing force with decreasing head distances so that a contact and serious wear of the head and/or the recording surface are involved, whereas the high bearing force with curved floating shoes results in an axial displacement of disc-shaped recording surfaces, which is inadmissible for the recording process.

The invention has for its object to obviate said difficulties and is characterized in that for values of the characteristic number G equal to or higher than 50 the width of the bearing surface measured in the direction of movement of the recording surface is at least three times the dimension of length of the bearing surface.

By this measure according to the invention the resistance of the gap between the bearing surface and the recording surface against lateral escape of the air is reduced so that the pressure below the shoe, even in the case of high speeds and small gap heights, decreases, as a result of which on the one hand with flat bearing surfaces the static instability due to the compressibility of the air and on the other hand excessively high bearing forces with curved bearing surfaces are obviated. Moreover, it appears that by the measure according to the invention the dynamic behaviour both of flat and curved floating shoes is improved since the damping is relatively increased.

The bearing force reduced by the measure according to the invention should remain a practically useful magnitude.

With regard thereto the invention provides preferably a connection of two or more floating shoes, in which the bearing surfaces of the floating shoes each satisfying the requirement of the width/length ratio of at least 3:1, are located parallel to and at a distance from each other in one and the same plane. This plane may be a flat or a curved plane. Since the floating shoes are spaced apart fiom each other, the ambient pressure prevails in the spaces between the shoes so that the variation of a pressure produced beneath a shoe—the so-called pressure profile—is not acted upon by the presence of adjacent shoes, whereas the bearing force which is a function of the overall surface of the bearing surfaces is increased.

A practical embodiment of a connection of floating shoes according to the invention consists in that the recording heads are arranged in one block of material, whilst the bearing surface of the resultant common floating shoe is provided with a plurality of grooves which divide the bearing surface into separate surfaces the width/length ratio of which is at least 3:1. In the grooves whose width and depth are comparatively large with respect to the height of the pressure producing gaps prevails the ambient pressure so that a grooved shoe according to the invention may be considered as forming a plurality of discrete floating shoes operating in parallel.

One embodiment of the invention will be described more fully with reference to the drawing.

FIG. 1 shows the conventional arrangement of a recording surface and a floating shoe having a flat bearing surface.

Figure 2:
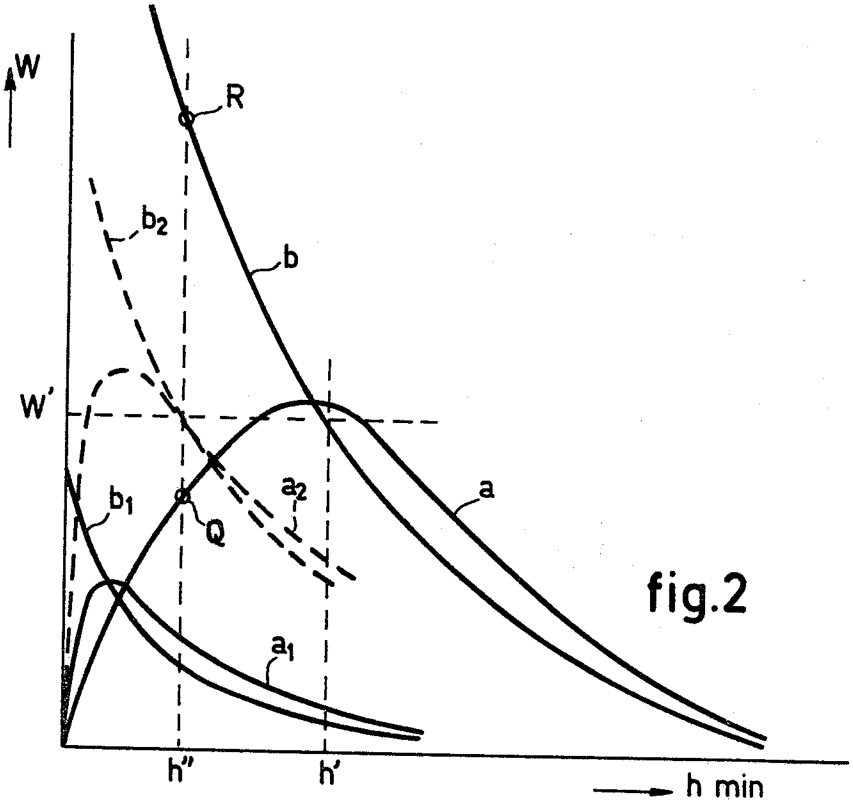
Figure 3:
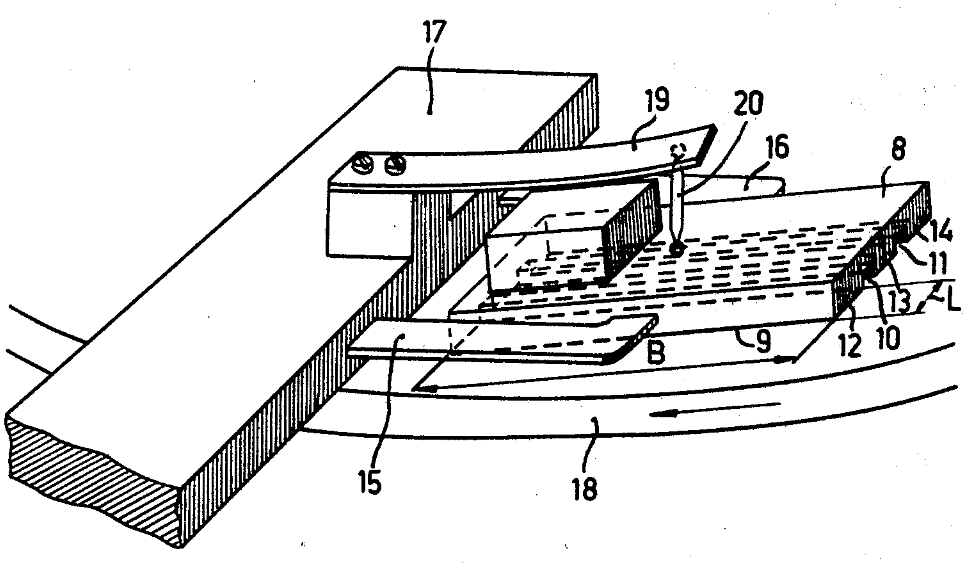

FIG. 2 shows graphs indicating the relationship between the bearing force and the minimum distance between the floating shoe and the recording surface with known floating shoes having a flat and a curved bearing surface and with floating shoes and connections thereof according to the invention, and FIG. 3 shows perspectively part of a disc-shaped recording surface above which a plurality of interconnected floating shoes according to the invention are arranged.

As is shown in FIG. 1, a rotatable disc-shaped carrier 1, the figure showing a sectional view taken along a chord, is provided with a magnetically sensitive layer 2, which forms a recording surface of a magnetic recording device, the speed of which disc is indicated by U. Above the disc 1 is suspended in known manner (not shown), for example, by universal joints, a recording head 4, fastened in a floating shoe 3. Reading and writing windings for the head are designated by 5 and the head gap is designated by 6. In the narrowing space A between a bearing surface 7 of the floating shoe 3 and the recording surface 1, 2 viscous frictional forces in the ambient medium, usually air, provide for a pressure which supplies the bearing force W for the floating shoe, which force establishes an equilibrium with a load P applied to the shoe externally. The resultant air cushion behaves like a comparatively rigid spring so that the shoe can follow unevennesses in and swinging motions of the moving recording surface without an essential variation of the distance between the head gap 6 and the magnetic layer 2.

The known floating shoes having a flat bearing surface give rise to difficulties, in the case of small head distance $h_{min}$ and high speeds U of the recording surface, in the form of a static instability, which is illustrated more clearly with reference to FIG. 2. Stable operation of a flat floating shoe is possible when the air cushion has a so-called positive spring stiffness; that means, if with a constant point of application $x_0$ of the external load P with a decreasing minimium distance $h_{min}$ or with an increase in speed U, consequently with increasing values of the characteristic number G, a higher value of the bearing force W is attained. With the conventional dimensions of bearing surfaces, in which the ratio between the width B, measured in the direction of movement U of recording surface, and the length of the bearing surface measured at right angles thereto amounts to 1 to 1.5, the graph *a* relating to known flat floating shoes indicates for values $h_{min}>h'$ ($G<50$) with decreasing $h_{min}$ *a* rising path which attains a maximum with $h_{min}=h'$ (values of G of about 50). The value of $h'$ is found in practice to be 5 to 6/$\mu$m. For values $h_{min}<h'$ ($G>50$) the graph shows (to the left of the maximum) a decscending path so that only with values $h_{min}>h'$ ($G<50$) a stable operation is possible. The descending course of the line *a* to the left of the maximum represents said instability with the known flat floating shoes due to the compressibility of the air in the air gap. This compressibility, which acts in accordance with high G values, brings about such a variation of the pressure profile beneath the floating shoe that the resultant shifts in the direction of movement by which the shoe is tilted to an extent such that the ratio $h_1''h_{min}$ (see FIG. ratio $h_1/h_{min}$ may even become 1, by which the bearing 1) is reduced and the bearing force decreases. Finally the ratio $h_1/h_{min}$ may even become 1, by which the bearing force is reduced to zero.

The graph *b* relates to the known floating shoes having a curved, for example, cylindrical or spherical bearing surface. This graph shows on the one hand that with such bearing surfaces said instability does not occur, since with lower values of $h_{min}$ are always associated increasing values of the bearing force W, and on the other hand that with values $h_{min}<h'$ the bearing force increases to inadmissibly high values.

Recapitulating it can be said that with a comparatively small head distance $h''$, for example, $h''=3/\mu$m. static instability appears with flat floating shoes (point Q of graph *a*), whereas an inadmissibly high bearing force appears with curved floating shoes (point R of graph *h*). The same difficulties arise with an increase in speed U of the recording surface, or more in general, in view of the relationship between G, U and $h_{min}$, with an increase of the characteristic number G.

According to the invention with values of the characteristic number G equal to or higher than 50 the width B of the bearing surface, measured in the direction of movement of the recording surface, is at least three times the length of the bearing surface.

The effect of the measure according to the invention appears from the graphs $a_1$ and $b_1$ of FIG. 2; the graph $a_1$ shows that the region in which the flat floating shoes are capable of operating in a stable manner is appreciably extended and shifted in the direction of smaller gap heights $h_{min}$ or higher speeds U and hence higher values of G, by which the risk of static instability is materially reduced, whereas the graph $b_1$ shows that with floating shoes having a curved bearing surface the bearing force is considerably reduced, which also applies indeed to flat floating shoes as appears from the graph $a_1$.

The bearing force which is reduced by the measure according to the invention should have a practically useful magnitude. If the obtainment of such a useful magnitude of the bearing force requires, for example, a value $W^1$ (see FIG. 2), this can be satisfied by interconnecting in accordance with the invention two or more floating shoes whose bearing surfaces each have a width/length ratio of at least 3:1 so that the bearing surfaces are located parallel to each other and at a distance from each other in one and the same flat or curved plane. The relationship between the bearing force and the minimum head distance appears for such a connection according to the invention from the graphs $a_2$ and $b_2$ relating to a combination of three floating shoes having a flat and a curved bearing surface respectively.

A practical embodiment of the invention, in which the bearing force has a useful value $W^1$, is shown in FIG. 3. A number of recording heads (not shown) are arranged in a block of material 8 and a bearing surface 9 of the resultant floating shoe is provided with two grooves 10, 11, which divide the bearing surface into three discrete surfaces 12, 13, 14, whose ratio between the width B and the length L is at least 3:1.

The floating shoe is suspended by means of leaf springs 15, 16 on an element 17, which forms part of a positioning mechanism (not shown) by means of which the recording heads can be adjusted to a desired area opposite a disc-shaped recording surface 18. A leaf spring 19, secured to the element 17, supplies the external load of the floating shoe by means of a pin 20 tapering to both ends and journalled at one end in the upper face of the floating shoe and at the other end in the free end of the leaf spring 19.

The invention is not restricted to the embodiment described above and shown in the drawing. In general the invention applies both to floating shoes whose bearing surfaces have a width measured in the direction of movement of the recording surface at least three times the length of said surface and to connections of two or more of such floating shoes whose bearing surfaces are located parallel to and at a distance from each other in one and the same plane.

Apart from the connection shown in FIG. 3, any other rigid mechanical connection may, in general, be employed. With respect to the embodiment shown in FIG. 3 is should be noted that also embodiments having one groove or three or more grooves are also within the scope of the invention.

What is claimed is:

1. A floating shoe for one or more recording heads for use in a device for recording and/or reproducing magnetic registrations, comprising a disc-shaped or cylindrical recording surface, the floating shoe having a bearing surface capable of holding by the aerodynamic lubrication principle the recording head(s) at a distance from the recording surface, characterized in that with values of the known characteristics number G of the floating shoe equal to or higher than 50, the width of the bearing surface measured in the direction of movement of the recording surface is at least three times the length of the bearing surface, the characteristic number G being defined as follows:

$$G=\frac{6\eta UB}{P_a h_{min.}^2}$$

wherein $\eta$=dynamic viscosity of the ambient medium (N sec./m.$^2$),
U=linear speed of movement of the recording surface (m./sec.),
B=dimension of the bearing surface of the floating shoe measured in the direction U (m.),
$P_a$=ambient pressure of said medium (N/m.$^2$),
$h_{min.}$=minimum distance between bearing surface and recording surface (m.).

2. A connection of two or more floating shoes as claimed in claim 1, characterized in that the bearing surfaces of the shoes each satisfying the requirement of the width/length ratio of at least 3:1 are located parallel to and at a distance from each other in one and the same plane.

3. A connection as claimed in claim 2 characterized in that the recording heads are arranged in a single block of carrier material, and that the bearing surface of the resultant common floating shoe is provided with a plurality of grooves, which divide the bearing surface into discrete surfaces each having a width/length ratio of at least 3:1.

References Cited

UNITED STATES PATENTS 3,430,006 2/1969 Taylor et al. ------ 179—100.2

BERNARD KONICK, Primary Examiner

V. P. CANNEY, Assistant Examiner

U.S. Cl. X.R.

179—100.2

PO-1050
(5/69)

UNITED STATES PATENT OFFICE
CERTIFICATE OF CORRECTION

Patent No. 3,525,987 Dated August 25, 1970

Inventor(s) E.A. Muijderman, J.M. Visscher, and J. van der Hilst

It is certified that error appears in the above-identified patent and that said Letters Patent are hereby corrected as shown below:

Column 1, line 67, change "N(N sec./" to --(N sec./--;

Column 3, line 58, change "$h_l$"$h_{min}$" to --$h_l/h_{min}$--;

Column 3, line 59, omit "ratio $h_l/h_{min}$ may even become 1, by which the bearing"

SIGNED AND
SEALED
NOV 17 1970

(SEAL)
Attest:

Edward M. Fletcher, Jr.
Attesting Officer

WILLIAM E. SCHUYLER, JR.
Commissioner of Patents